United States Patent
Ma

(10) Patent No.: US 11,777,873 B1
(45) Date of Patent: Oct. 3, 2023

(54) METHOD AND APPARATUS FOR MANAGING BUFFERING OF DATA PACKET OF NETWORK CARD, TERMINAL AND STORAGE MEDIUM

(71) Applicant: INSPUR SUZHOU INTELLIGENT TECHNOLOGY CO., LTD., Jiangsu (CN)

(72) Inventor: Xu Ma, Shandong (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/245,791

(22) PCT Filed: Sep. 28, 2021

(86) PCT No.: PCT/CN2021/121432
§ 371 (c)(1),
(2) Date: Mar. 17, 2023

(87) PCT Pub. No.: WO2022/100310
PCT Pub. Date: May 19, 2022

(30) Foreign Application Priority Data

Nov. 12, 2020 (CN) .......................... 202011264058.9

(51) Int. Cl.
*H04L 49/901* (2022.01)
*H04L 49/9047* (2022.01)
*H04L 47/625* (2022.01)
*H04L 47/80* (2022.01)

(52) U.S. Cl.
CPC ........ *H04L 49/901* (2013.01); *H04L 47/6255* (2013.01); *H04L 47/803* (2013.01); *H04L 49/9047* (2013.01)

(58) Field of Classification Search
CPC ... H04L 49/901; H04L 49/90; H04L 49/9042; H04L 49/9047; H04L 49/9015;
(Continued)

(56) References Cited

U.S. PATENT DOCUMENTS

2012/0265945 A1* 10/2012 Miyasaka .......... G06K 15/1803
711/E12.002
2020/0218662 A1  7/2020 Ren et al.

FOREIGN PATENT DOCUMENTS

CN          101267293 A  *  9/2008
CN          101707564 A       5/2010
(Continued)

OTHER PUBLICATIONS

Search report for international application No. PCT/CN2021/121432 dated Dec. 30, 2021.
(Continued)

*Primary Examiner* — Phong La
(74) *Attorney, Agent, or Firm* — Dennemeyer & Associates LLC; Victoria Friedman

(57) ABSTRACT

A method and apparatus for managing buffering of data packets of a network card, a terminal and a storage medium are provided. The method includes: setting ring buffer queues, setting a length of each ring buffer queue, then setting a buffer pool formed by two ring buffer queues, and setting the two ring buffer queues in the buffer pool as a busy queue and an idle queue, respectively; a network card driver receiving data packets from a data link, classifying the data packets, sequentially buffering the classified data packets into the busy queue, and then sequentially mapping addresses of the buffered data packets in the busy queue into the idle queue; acquiring latest addresses of the buffered data packets in the busy queue; and the upper-layer application successively acquiring and processing the buffered data
(Continued)

packets, and successively releasing the addresses of the processed buffered data packets in the busy queue.

18 Claims, 3 Drawing Sheets

(58) Field of Classification Search
CPC ............. H04L 49/9021; H04L 47/6255; H04L 47/625; H04L 47/628; H04L 47/803; H04L 47/801; H04L 47/80; H04L 47/805; H04L 47/808
See application file for complete search history.

(56) References Cited

FOREIGN PATENT DOCUMENTS

| | | | | |
|---|---|---|---|---|
| CN | 101764760 | A | 6/2010 | |
| CN | 102541779 | A | 7/2012 | |
| CN | 102546386 | A | 7/2012 | |
| CN | 103391256 | A | 11/2013 | |
| CN | 103885527 | A * | 6/2014 | |
| CN | 104809075 | A * | 7/2015 | |
| CN | 105071973 | A | 11/2015 | |
| CN | 106502934 | A * | 3/2017 | ......... G06F 12/0842 |
| CN | 109062826 | A | 12/2018 | |
| CN | 109783250 | A | 5/2019 | |
| CN | 108683536 | B * | 1/2021 | ........... H04L 41/145 |
| CN | 112491979 | A | 3/2021 | |
| WO | 2016101473 | A1 | 6/2016 | |
| WO | 2019227724 | A1 | 12/2019 | |

OTHER PUBLICATIONS

Search report for Chinese application No. 202011264058.9 filed on Nov. 12, 2020.

* cited by examiner

METHOD AND APPARATUS FOR MANAGING BUFFERING OF DATA PACKET OF NETWORK CARD, TERMINAL AND STORAGE MEDIUM

CROSS-REFERENCE TO RELATED APPLICATIONS

This is a 35 U.S.C. 371 National Stage Patent Application of International Application No. PCT/CN2021/121432, filed Sep. 28, 2021, which claims priority to Chinese application 202011264058.9, filed Nov. 12, 2020, each of which is hereby incorporated by reference in its entirety.

TECHNICAL FIELD

The present disclosure relates to the technical field of network card data processing, and in particular, to a method and apparatus for buffering of data packets of a network card, a terminal, and a storage medium.

BACKGROUND

In order to increase the packet receiving efficiency, a network card driver performs buffering processing on received data packets, and an upper-layer network application consumes the data packets from a buffer structure and processes the data packets in a buffering form, which may improve the packet receiving and sending efficiency of the network card to a great extent. However, as the network card driver and the upper-layer application may need to simultaneously process the data packets in the buffer structure, when adding or deleting elements in the buffer structure, locking/unlocking processing usually needs to be performed on the elements in the buffer structure, which affects the packet receiving and sending efficiency of the network card to a certain extent, and also may cause deadlock in some anomalous situations, thereby causing breakdown of the network card driver.

In view of the above defects in the related art, it is very necessary to provide a method and apparatus for managing buffering of data packets of a network card, a terminal, and a storage medium.

SUMMARY

Regarding the defects in the related art that when a network card driver and an upper-layer application simultaneously perform data processing, locking and unlocking processing needs to be performed on elements in a buffer structure, which affects the packet receiving and sending efficiency of a network card, some embodiments of the present disclosure provide a method and apparatus for managing buffering of data packets of a network card, a terminal, and a storage medium, which may solve the described technical problems.

According to a first aspect, some embodiments of the present disclosure provide a method for managing buffering of data packets of a network card, including the following operations:

S1, setting ring buffer queues, setting a length of each ring buffer queue according to a size of a total buffer space and the number of threads of an upper-layer application, then setting a buffer pool formed by two ring buffer queues, and setting the two ring buffer queues in the buffer pool as a busy queue and an idle queue, respectively;

S2, a network card driver receiving data packets from a data link, classifying the data packets, sequentially buffering the classified data packets into the busy queue by using a write pointer of the busy queue, and then sequentially mapping addresses of the buffered data packets in the busy queue into the idle queue;

S3, acquiring latest addresses of the buffered data packets in the busy queue by using a read pointer of the idle queue; and S4, the upper-layer application sequentially acquiring the buffered data packets by using a read pointer of the busy queue and processing the data packets, and after processing of the data packets is completed, sequentially releasing addresses of the processed buffered data packets in the busy queue by using a write pointer of the idle queue.

Further, the method further includes the following operations:

S5, acquiring the read pointer and the write pointer of the busy queue and the read pointer and the write pointer of the idle queue in real time, and according to relationships between the read pointer and the write pointer of the busy queue in real time and between the read pointer and the write pointer of the idle queue in real time, determining a state of the buffered data packets in the buffer pool, and whether an additional buffer pool needs to be set.

Further, S1 includes the following operations:

S11, calculating the length of each ring buffer queue=the size of the total buffer space/(the number of the threads of the upper-layer application*a size of a single data packet after classification);

S12, creating the two ring buffer queues according to the calculated length of each ring buffer queue;

S13, setting one of the two ring buffer queues as the busy queue and the other one of the two ring buffer queues as the idle queue; and ring;

S14, setting the busy queue and the idle queue as the buffer pool.

Further, S2 includes the following operations:

S21, the network card driver receiving the data packets from the data link into a receiving link S22, the network card driver performing hash classification on the data packets;

S23, the network card driver sequentially buffering the classified data packets into the busy queue by using the write pointer of the busy queue; and S24, the network card driver sequentially mapping the addresses of the buffered data packets in the busy queue into the idle queue.

Further, S4 includes the following operations:

S41, the upper-layer application sequentially acquiring the buffered data packets by using the read pointer of the busy queue;

S42, the upper-layer application sequentially processing the buffered data packets; and S43, the upper-layer application sequentially acquiring and releasing, from the idle queue, the addresses of the processed buffered data packets in the busy queue by using the write pointer of the idle queue.

Further, S5 includes the following operations:

S51, acquiring the read pointer and the write pointer of the busy queue and the read pointer and the write pointer of the idle queue in real time;

S52, determining whether the read pointer of the busy queue is equal to the write pointer of the busy queue;

in a case where the read pointer of the busy queue is equal to the write pointer of the busy queue, determining that the busy queue is empty and there is no buffered data packet, and returning to S2; and in a case where the read pointer of the busy queue is not equal to the write pointer of the busy queue, proceeding to S53, or proceeding to S54;

S53, determining whether a next position of the write pointer of the busy queue is the read pointer of the busy queue, i.e. the write pointer of the busy queue+1=the read pointer of the busy queue;

in a case where the next position of the write pointer of the busy queue is the read pointer of the busy queue, determining that the busy queue is full, and proceeding to S55; and in a case where the next position of the write pointer of the busy queue is not the read pointer of the busy queue, returning to S2;

S54, determining whether a next read pointer of the idle queue is greater than the write pointer of the idle queue, i.e. the read pointer of the idle queue+1>the write pointer of the idle queue;

in a case where the next read pointer of the idle queue is greater than the write pointer of the idle queue, determining that idle memory addresses of the idle queue have been completely consumed, and proceeding to S55; and in a case where the next read pointer of the idle queue is not greater than the write pointer of the idle queue, returning to S2; and S55, repeating S1 to set an additional buffer pool.

According to a second aspect, some embodiments of the present disclosure provide an apparatus for managing buffering of data packets of a network card, including:

a buffer pool setting module, configured to set ring buffer queues, set a length of each ring buffer queue according to a size of a total buffer space and the number of threads of an upper-layer application, then set a buffer pool formed by two ring buffer queues, and set the two ring buffer queues in the buffer pool as a busy queue and an idle queue, respectively;

a data buffering module, configured to enable a network card driver to receive data packets from a data link, classify the data packets, sequentially buffer the classified data packets into the busy queue by using a write pointer of the busy queue, and then sequentially map addresses of the buffered data packets in the busy queue into the idle queue;

a buffer address acquisition module, configured to acquire latest addresses of the buffered data packets in the busy queue by using a read pointer of the idle queue; and a data processing module, configured to enable the upper-layer application to sequentially acquire the buffered data packets by using a read pointer of the busy queue and process the data packets, and after processing of the data packets is completed, sequentially release addresses of the processed buffered data packets in the busy queue by using a write pointer of the idle queue.

Further, the apparatus further includes:

a buffer number determination module, configured to acquire the read pointer and the write pointer of the busy queue and the read pointer and the write pointer of the idle queue in real time, and according to relationships between the read pointer and the write pointer of the busy queue in real time and between the read pointer and the write pointer of the idle queue in real time, determine a state of the buffered data packets in the buffer pool, and whether an additional buffer pool needs to be set.

According to a third aspect, a terminal is provided, including:

a processor and a memory, wherein the memory is configured to store a computer program; and the processor is configured to call the computer program from the memory and run the computer program to cause the terminal to execute the method according to the first aspect.

According to a fourth aspect, a computer storage medium is provided, the computer-readable storage medium stores instructions, wherein the instructions, when running on a computer, cause the computer to execute the method according to the first aspect.

The beneficial effects of the embodiments of the present disclosure are as follows.

In the method and apparatus for managing buffering of data packets of a network card, the terminal and the storage medium provided in the embodiments of the present disclosure, receiving, sending and releasing of data packet buffering are managed by means of two ring queues, a network card driver and an upper-layer application respectively operate read and write pointers on the ring queues, and data packet receiving, sending and releasing are achieved by using ring characteristics, thus, in a data packet processing process, it is unnecessary to perform locking and unlocking processing on elements in a buffer structure in the ring queues, improving the efficiency of packet receiving and sending of a network card, and improving the stability of running of the network card driver.

BRIEF DESCRIPTION OF THE DRAWINGS

In order to describe the technical solutions in the embodiments of the present disclosure or in the related art more clearly, accompanying drawings requiring to be used for describing the embodiments or the related art are introduced briefly below. Obviously, for a person having ordinary skill in the art, other accompanying drawings may also be obtained according to these accompanying drawings without any inventive effort.

Figure 1:
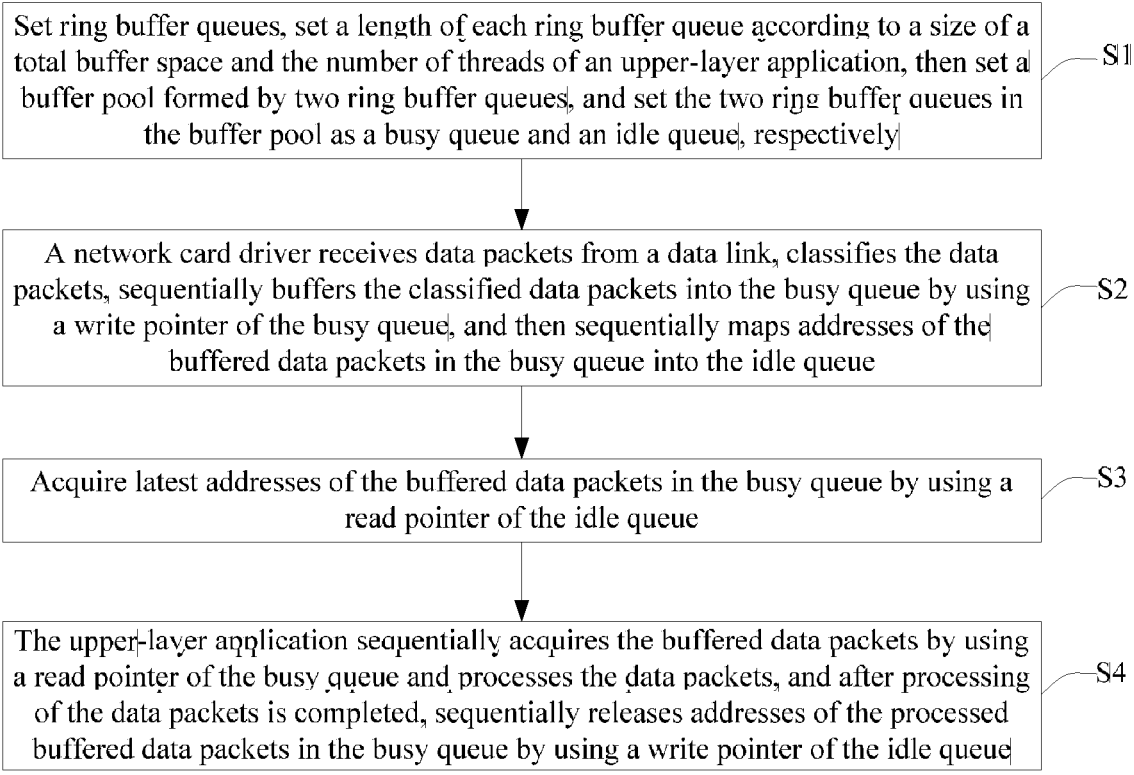
FIG. 1 is a schematic flowchart I of a method according to some embodiments of the present disclosure.

In the drawings: 1—Buffer pool setting module; 1.1—Queue length calculation unit; 1.2—Ring buffer queue creation unit; 1.3—Ring buffer queue division setting unit; 1.4—Buffer pool setting unit; 2—Data buffering module; 2.1—Data packet receiving unit; 2.2—Data packet classification unit; 2.3—Data packet buffering unit; 2.4—Address storage unit; 3—Buffer address acquisition module; 4—Data processing module; 4.1—Data packet acquisition unit; 4.2—Data packet processing unit; 4.3—Address releasing unit; 5—Buffer number determination module; 5.1—Pointer acquisition unit; 5.2—Pointer equality determination unit; 5.3—Empty queue determination unit; 5.4—Busy queue write pointer determination unit; 5.5—Full busy queue determination unit; 5.6—Idle queue read pointer determination unit; 5.7—Idle address complete consumption determination unit; 5.8—Buffer pool addition unit.

DETAILED DESCRIPTION

In order to make a person having ordinary skill in the art better understand the technical solutions of some embodiments of the present disclosure, the technical solutions in embodiments of the present disclosure will be described clearly and thoroughly with reference to the accompanying drawings of embodiments of the present disclosure. Apparently, the described embodiments are merely a part rather than all of the embodiments of the present disclosure. All other embodiments obtained by a person having ordinary skill in the art based on the embodiments of the present disclosure without any inventive effort shall all fall within the scope of protection of the present disclosure.

Embodiment 1

As shown in FIG. 1, some embodiments of the present disclosure provide a method for managing buffering of data packets of a network card, including the following operations:

S1, setting ring buffer queues, setting a length of each ring buffer queue according to a size of a total buffer space and the number of threads of an upper-layer application, then setting a buffer pool formed by two ring buffer queues, and setting the two ring buffer queues in the buffer pool as a busy queue and an idle queue, respectively;

S2, a network card driver receiving data packets from a data link, classifying the data packets, sequentially buffering the classified data packets into the busy queue by using a write pointer of the busy queue, and then sequentially mapping addresses of the buffered data packets in the busy queue into the idle queue;

S3, acquiring latest addresses of the buffered data packets in the busy queue by using a read pointer of the idle queue; and S4, the upper-layer application sequentially acquiring the buffered data packets by using a read pointer of the busy queue and processing the data packets, and after processing of the data packets is completed, sequentially releasing addresses of the processed buffered data packets in the busy queue by using a write pointer of the idle queue.

Embodiment 2

Figure 2:
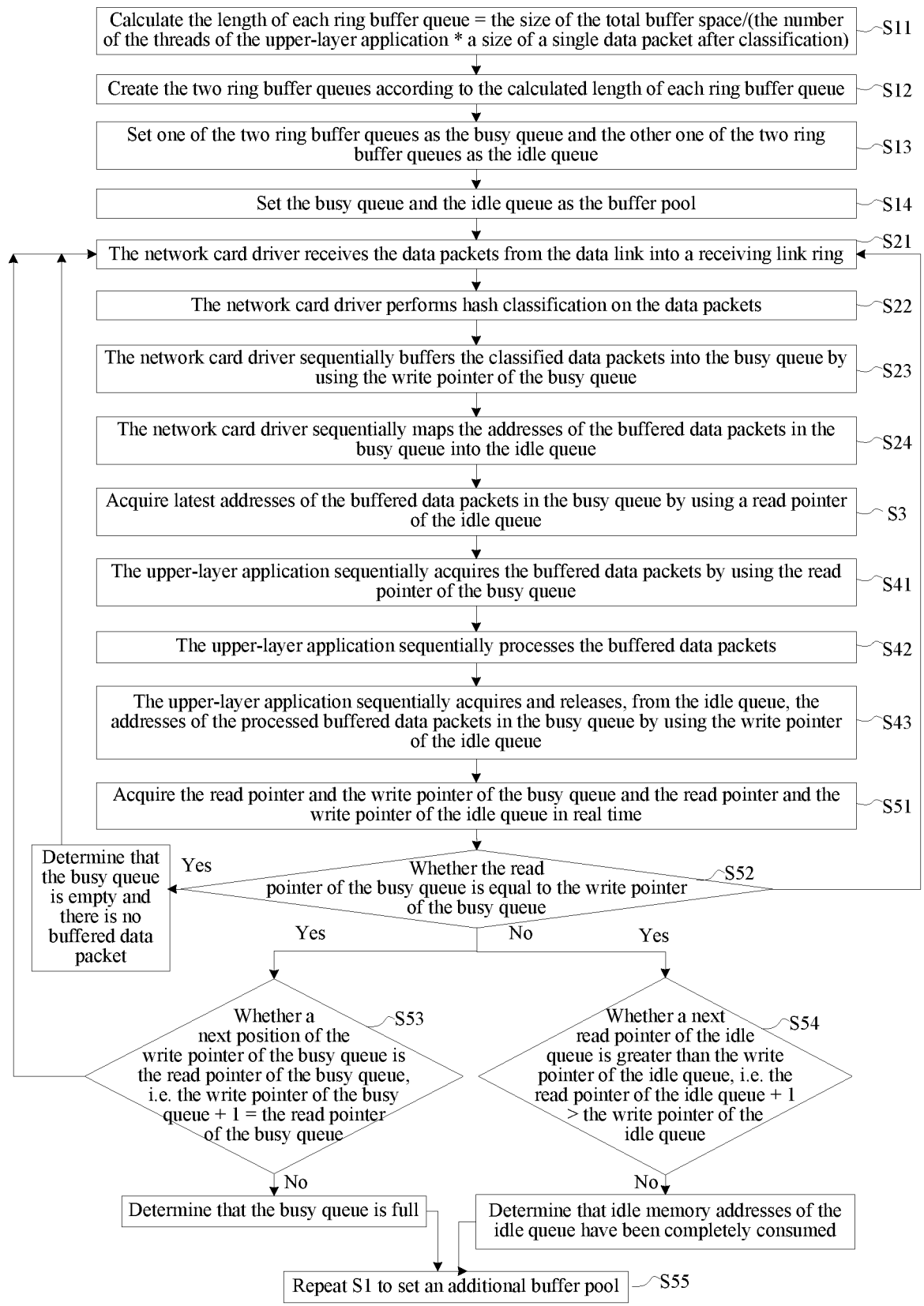
FIG. 2 is a schematic flowchart II of a method according to some embodiments of the present disclosure.

As shown in FIG. 2, some embodiments of the present disclosure provide a method for managing buffering of data packets of a network card, including the following operations S1 to S5.

S1, ring buffer queues are set, a length of each ring buffer queue is set according to a size of a total buffer space and the number of threads of an upper-layer application, then a buffer pool formed by two ring buffer queues is set, and the two ring buffer queues in the buffer pool are set as a busy queue and an idle queue, respectively. In some exemplary embodiments, S1 includes the following operations:

S11, calculating the length of each ring buffer queue=the size of the total buffer space/(the number of the threads of the upper-layer application*a size of a single data packet after classification);

S12, creating the two ring buffer queues according to the calculated length of each ring buffer queue;

S13, setting one of the two ring buffer queues as the busy queue and the other one of the two ring buffer queues as the idle queue; and S14, setting the busy queue and the idle queue as the buffer pool.

S2, a network card driver receives data packets from a data link, classifies the data packets, sequentially buffers the classified data packets into the busy queue by using a write pointer of the busy queue, and then sequentially maps addresses of the buffered data packets in the busy queue into the idle queue. In some exemplary embodiments, S2 includes the following operations: ring;

S21, a network card driver receiving the data packets from the data link into a receiving link S22, the network card driver performing hash classification on the data packets;

S23, the network card driver sequentially buffering the classified data packets into the busy queue by using the write pointer of the busy queue; and S24, the network card driver sequentially mapping the addresses of the buffered data packets in the busy queue into the idle queue.

S3, latest addresses of the buffered data packets in the busy queue are acquired by using a read pointer of the idle queue.

S4, the upper-layer application sequentially acquires the buffered data packets by using a read pointer of the busy queue and processes the data packets, and after processing of the data packets is completed, sequentially releases addresses of the processed buffered data packets in the busy queue by using a write pointer of the idle queue. In some exemplary embodiments, S4 includes the following operations:

S41, the upper-layer application sequentially acquiring the buffered data packets by using the read pointer of the busy queue;

S42, the upper-layer application sequentially processing the buffered data packets; and S43, the upper-layer application sequentially acquiring and releasing, from the idle queue, the addresses of the processed buffered data packets in the busy queue by using the write pointer of the idle queue.

S5, the read pointer and the write pointer of the busy queue and the read pointer and the write pointer of the idle queue are acquired in real time, and according to relationships between the read pointer and the write pointer of the busy queue in real time and between the read pointer and the write pointer of the idle queue in real time, a state of the buffered data packets in the buffer pool is determined, and whether an additional buffer pool needs to be set is determined. In some exemplary embodiments, S5 includes the following operations:

S51, acquiring the read pointer and the write pointer of the busy queue and the read pointer and the write pointer of the idle queue in real time;

S52, determining whether the read pointer of the busy queue is equal to the write pointer of the busy queue;

in a case where the read pointer of the busy queue is equal to the write pointer of the busy queue, determining that the busy queue is empty and there is no buffered data packet, and returning to S2; and in a case where the read pointer of the busy queue is not equal to the write pointer of the busy queue, proceeding to S53, or proceeding to S54;

S53, determining whether a next position of the write pointer of the busy queue is the read pointer of the busy queue, i.e. the write pointer of the busy queue+1=the read pointer of the busy queue;

in a case where the next position of the write pointer of the busy queue is the read pointer of the busy queue, determining that the busy queue is full, and proceeding to S55; and in a case where the next position of the write pointer of the busy queue is not the read pointer of the busy queue, returning to S2;

S54, determining whether a next read pointer of the idle queue is greater than the write pointer of the idle queue, i.e. the read pointer of the idle queue+1>the write pointer of the idle queue;

in a case where the next read pointer of the idle queue is greater than the write pointer of the idle queue, determining that idle memory addresses of the idle queue have been completely consumed, and proceeding to S55; and in a case where the next read pointer of the idle queue is not greater than the write pointer of the idle queue, returning to S2; and S55, repeating S1 to set an additional buffer pool.

In some embodiments, multiple groups of buffer pools may also be set in advance according to the number of packet receiving and sending threads of the upper-layer application.

In some embodiments, the network card driver only operates the write pointer and the read pointer of the busy queue.

The read pointer of the busy queue always cannot exceed the write pointer, and in an initial state, the read pointer and the write pointer of the busy queue are at the same position.

When the read pointer and the write pointer of the busy queue are equal, it represents that the busy queue is empty, the processing of the buffered data packets has been completed, and at this time, there is no buffered data packet.

When a next position following the write pointer is the read pointer, i.e. bwp+1=brp, it represents that the busy queue is full, and at this time, packet loss may occur.

In some embodiments, the upper-layer application only operates the write pointer and the read pointer of the idle queue.

The read pointer of the idle queue always cannot exceed the write pointer, and in an initial state, the read pointer and the write pointer are located at a first idle memory address.

When a next position following the read pointer of the idle queue exceeds the write pointer, it represents that the memory address of the idle queue has been consumed completely, and at this time, data packets cannot be buffered, and packet loss may occur.

Embodiment 3

Figure 3:
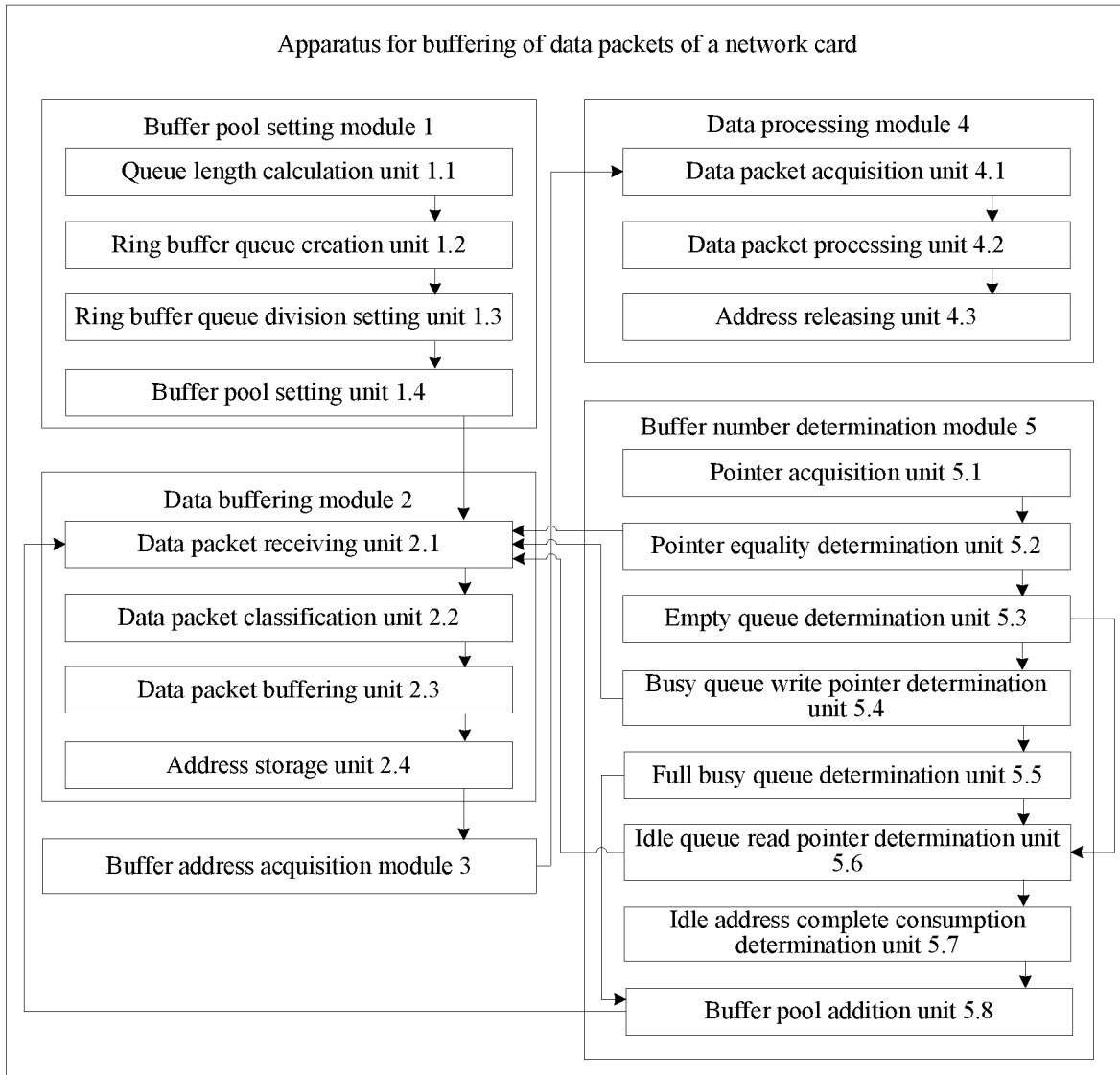
FIG. 3 is a schematic diagram of a system according to some embodiments of the present disclosure.

As shown in FIG. 3, some embodiments of the present disclosure provide an apparatus for managing buffering of data packets of a network card, including:

a buffer pool setting module 1, configured to set ring buffer queues, set a length of each ring buffer queue according to a size of a total buffer space and the number of threads of an upper-layer application, then set a buffer pool formed by two ring buffer queues, and set the two ring buffer queues in the buffer pool as a busy queue and an idle queue, respectively; the buffer pool setting module 1 includes:

a queue length calculation unit 1.1, configured to calculate the length of each ring buffer queue=the size of the total buffer space/(the number of the threads of the upper-layer application*a size of a single data packet after classification);

a ring buffer queue creation unit 1.2, configured to create the two ring buffer queues according to the calculated length of each ring buffer queue;

a ring buffer queue division setting unit 1.3, configured to set one of the two ring buffer queues as the busy queue and the other one of the two ring buffer queues as the idle queue; and pool;

a buffer pool setting unit 1.4, configured to set the busy queue and the idle queue as the buffer a data buffering module 2, configured to enable a network card driver to receive data packets from a data link, classify the data packets, sequentially buffer the classified data packets into the busy queue by using a write pointer of the busy queue, and then sequentially map addresses of the buffered data packets in the busy queue into the idle queue; the data buffering module 2 includes:

a data packet receiving unit 2.1, configured to enable a network card driver to receive the data packets from the data link into a receiving link ring;

a data packet classification unit 2.2, configured to enable the network card driver to perform hash classification on the data packets;

a data packet buffering unit 2.3, configured to enable the network card driver to sequentially buffer the classified data packets into the busy queue by using the write pointer of the busy queue; and an address storage unit 2.4, configured to enable the network card driver to sequentially map the addresses of the buffered data packets in the busy queue into the idle queue;

a buffer address acquisition module 3, configured to acquire latest addresses of the buffered data packets in the busy queue by using a read pointer of the idle queue;

a data processing module 4, configured to enable the upper-layer application to sequentially acquire the buffered data packets by using a read pointer of the busy queue and process the data packets, and after processing of the data packets is completed, sequentially release addresses of the processed buffered data packets in the busy queue by using a write pointer of the idle queue; the data processing module 4 includes:

a data packet acquisition unit 4.1, configured to enable the upper-layer application to sequentially acquire the buffered data packets by using the read pointer of the busy queue;

a data packet processing unit 4.2, configured to sequentially process the buffered data packets; and an address releasing unit 4.3, configured to enable the upper-layer application to sequentially acquire and release, from the idle queue, the addresses of the processed buffered data packets in the busy queue by using the write pointer of the idle queue; and a buffer number determination module 5, configured to acquire the read pointer and the write pointer of the busy queue and the read pointer and the write pointer of the idle queue in real time, and according to relationships between the read pointer and the write pointer of the busy queue in real time and between the read pointer and the write pointer of the idle queue in real time, determine a state of the buffered data packets in the buffer pool, and whether an additional buffer pool needs to be set; the buffer number determination module 5 includes:

a pointer acquisition unit 5.1, configured to acquire the read pointer and the write pointer of the busy queue and the read pointer and the write pointer of the idle queue in real time;

a pointer equality determination unit 5.2, configured to determine whether the read pointer of the busy queue is equal to the write pointer of the busy queue;

an empty queue determination unit 5.3, configured to determine that the busy queue is empty when the read pointer and the write pointer of the busy queue are equal, and there is no buffered data packet;

a busy queue write pointer determination unit 5.4, configured to determine whether a next position of the write pointer of the busy queue is the read pointer of the busy queue, i.e. the write pointer of the busy queue+1=the read pointer of the busy queue;

a full busy queue determination unit 5.5, configured to determine that the busy queue is full when a next position of the write pointer of the busy queue is a read pointer;

an idle queue read pointer determination unit 5.6, configured to determine that a next read pointer of the idle queue is greater than the write pointer of the idle queue, i.e. the read pointer of the idle queue+1>the write pointer of the idle queue;

an idle address complete consumption determination unit 5.7, configured to determine that idle memory addresses of the idle queue have been completely consumed if a next read pointer of the idle queue is greater than the write pointer of the idle queue; and a buffer pool addition unit 5.8, configured to add a buffer pool when the busy queue is full and the idle memory address of the idle queue has been completely consumed.

Embodiment 4

Some embodiments of the present disclosure provide a terminal, including a processor and a memory, wherein the memory is configured to store a computer program; and the processor is configured to call the computer program from the memory and run the computer program to cause the terminal to execute the method according to Embodiment 1 or Embodiment 2.

Embodiment 5

Some embodiments of the present disclosure provide a storage medium; the computer-readable storage medium stores instructions, and the instructions, when running on a computer, cause the computer to execute the method according to Embodiment 1 or Embodiment 2.

Although some embodiments of the present disclosure have been described in detail with reference to the accompanying drawings in combination with preferred embodiments, some embodiments of the present disclosure are not limited thereto. A person having ordinary skill in the art may make various equivalent modifications or replacements to the embodiments of the present disclosure without departing from the spirit and essence of the present disclosure, and these modifications or replacements shall all fall within the coverage of the present disclosure. A person skilled in the art would have readily conceived of variations or replacements within the technical scope disclosed in the present disclosure, and the variations or replacements shall all fall within the scope of protection of the present disclosure. Thus, the scope of protection of the present disclosure shall be subject to the scope of protection of the claims.

What is claimed is:

1. A method for managing buffering of data packets of a network card, the method comprising:

S1, setting ring buffer queues, setting a length of each ring buffer queue according to a size of a total buffer space and the number of threads of an upper-layer application, then setting a buffer pool formed by two ring buffer queues, and setting the two ring buffer queues in the buffer pool as a busy queue and an idle queue, respectively;

S2, receiving, by a network card driver, data packets from a data link, classifying the data packets, sequentially buffering the classified data packets into the busy queue by using a write pointer of the busy queue, and then sequentially mapping addresses of the buffered data packets in the busy queue into the idle queue;

S3, acquiring latest addresses of the buffered data packets in the busy queue by using a read pointer of the idle queue;

S4, sequentially acquiring, by the upper-layer application, the buffered data packets by using a read pointer of the busy queue and processing the data packets, and after processing of the data packets is completed, sequentially releasing addresses of the processed buffered data packets in the busy queue by using a write pointer of the idle queue; and S5, acquiring the read pointer and the write pointer of the busy queue and the read pointer and the write pointer of the idle queue in real time, and according to relationships between the read pointer and the write pointer of the busy queue in real time and between the read pointer and the write pointer of the idle queue in real time, determining a state of the buffered data packets in the buffer pool, and whether an additional buffer pool needs to be set.

2. The method for managing buffering of data packets of the network card according to claim 1, wherein S1 comprises:

S11, calculating the length of each ring buffer queue=the size of the total buffer space/(the number of the threads of the upper-layer application*a size of a single data packet after classification);

S12, creating the two ring buffer queues according to the calculated length of each ring buffer queue;

S13, setting one of the two ring buffer queues as the busy queue and the other one of the two ring buffer queues as the idle queue; and S14, setting the busy queue and the idle queue as the buffer pool.

3. The method for managing buffering of data packets of the network card according to claim 2, wherein S2 comprises:

S21, receiving, by the network card driver, the data packets from the data link into a receiving link ring;

S22, performing, by the network card driver, hash classification on the data packets;

S23, sequentially buffering, by the network card driver, the classified data packets into the busy queue by using the write pointer of the busy queue; and S24, sequentially mapping, by the network card driver, the addresses of the buffered data packets in the busy queue into the idle queue.

4. The method for managing buffering of data packets of the network card according to claim 3, wherein S4 comprises:

S41, sequentially acquiring, by the upper-layer application, the buffered data packets by using the read pointer of the busy queue;

S42, sequentially processing, by the upper-layer application, the buffered data packets; and S43, sequentially acquiring and releasing, by the upper-layer application and from the idle queue, the addresses of the processed buffered data packets in the busy queue by using the write pointer of the idle queue.

5. The method for managing buffering of data packets of the network card according to claim 4, wherein S5 comprises:

S51, acquiring the read pointer and the write pointer of the busy queue and the read pointer and the write pointer of the idle queue in real time;

S52, determining whether the read pointer of the busy queue is equal to the write pointer of the busy queue;

in a case where the read pointer of the busy queue is equal to the write pointer of the busy queue, determining that the busy queue is empty and there is no buffered data packet, and returning to S2; and in a case where the read pointer of the busy queue is not equal to the write pointer of the busy queue, proceeding to S53, or proceeding to S54;

S53, determining whether a next position of the write pointer of the busy queue is the read pointer of the busy queue;

in a case where the next position of the write pointer of the busy queue is the read pointer of the busy queue, determining that the busy queue is full, and proceeding to S55; and in a case where the next position of the write pointer of the busy queue is not the read pointer of the busy queue, returning to S2;

S54, determining whether a next read pointer of the idle queue is greater than the write pointer of the idle queue;

in a case where the next read pointer of the idle queue is greater than the write pointer of the idle queue, determining that idle memory addresses of the idle queue have been completely consumed, and proceeding to S55; and in a case where the next read pointer of the idle queue is not greater than the write pointer of the idle queue, returning to S2; and S55, repeating S1 to set an additional buffer pool.

6. The method for managing buffering of data packets of the network card according to claim 5, wherein determining whether the next position of the write pointer of the busy queue is the read pointer of the busy queue comprises:
determining whether the write pointer of the busy queue+1=the read pointer of the busy queue.

7. The method for managing buffering of data packets of the network card according to claim 5, wherein determining whether the next read pointer of the idle queue is greater than the write pointer of the idle queue comprises:
determining whether the read pointer of the idle queue+1>the write pointer of the idle queue.

8. The method for managing buffering of data packets of the network card according to claim 1, wherein setting the buffer pool formed by two ring buffer queues comprises:
setting multiple buffer pools, each formed by two ring buffer queues, according to the number of packet receiving and sending threads of the upper-layer application.

9. The method for managing buffering of data packets of the network card according to claim 1, wherein the network card driver only operates the write pointer and the read pointer of the busy queue.

10. The method for managing buffering of data packets of the network card according to claim 1, wherein the read pointer of the busy queue does not exceed the write pointer of the busy queue, and in an initial state, the read pointer and the write pointer of the busy queue are at a same position.

11. The method for managing buffering of data packets of the network card according to claim 1, wherein the upper-layer application only operates the write pointer and the read pointer of the idle queue.

12. The method for managing buffering of data packets of the network card according to claim 1, wherein the read pointer of the idle queue does not exceed the write pointer of the idle queue, and in an initial state, the read pointer and the write pointer are located at a first idle memory address.

13. A terminal for managing buffering of data packets of a network card, the terminal comprising:

a processor and a memory, wherein the memory is configured to store a computer program; and the processor is configured to call the computer program from the memory and run the computer program to cause the terminal to execute following operations:

S1, setting ring buffer queues, setting a length of each ring buffer queue according to a size of a total buffer space and the number of threads of an upper-layer application, then setting a buffer pool formed by two ring buffer queues, and setting the two ring buffer queues in the buffer pool as a busy queue and an idle queue, respectively;

S2, receiving, by a network card driver, data packets from a data link, classifying the data packets, sequentially buffering the classified data packets into the busy queue by using a write pointer of the busy queue, and then sequentially mapping addresses of the buffered data packets in the busy queue into the idle queue;

S3, acquiring latest addresses of the buffered data packets in the busy queue by using a read pointer of the idle queue;

S4, sequentially acquiring, by the upper-layer application, the buffered data packets by using a read pointer of the busy queue and processing the data packets, and after processing of the data packets is completed, sequentially releasing addresses of the processed buffered data packets in the busy queue by using a write pointer of the idle queue; and S5, acquiring the read pointer and the write pointer of the busy queue and the read pointer and the write pointer of the idle queue in real time, and according to relationships between the read pointer and the write pointer of the busy queue in real time and between the read pointer and the write pointer of the idle queue in real time, determining a state of the buffered data packets in the buffer pool, and whether an additional buffer pool needs to be set.

14. The terminal according to claim 13, wherein the processor is configured to call the computer program from the memory and run the computer program to cause the terminal to execute following operation when executing S1:

S11, calculating the length of each ring buffer queue=the size of the total buffer space/(the number of the threads of the upper-layer application*a size of a single data packet after classification);

S12, creating the two ring buffer queues according to the calculated length of each ring buffer queue;

S13, setting one of the two ring buffer queues as the busy queue and the other one of the two ring buffer queues as the idle queue; and S14, setting the busy queue and the idle queue as the buffer pool.

15. The terminal according to claim 14, wherein the processor is configured to call the computer program from the memory and run the computer program to cause the terminal to execute following operation when executing S2:

S21, receiving, by the network card driver, the data packets from the data link into a receiving link ring;

S22, performing, by the network card driver, hash classification on the data packets;

S23, sequentially buffering, by the network card driver, the classified data packets into the busy queue by using the write pointer of the busy queue; and S24, sequentially mapping, by the network card driver, the addresses of the buffered data packets in the busy queue into the idle queue.

16. The terminal according to claim 15, wherein the processor is configured to call the computer program from the memory and run the computer program to cause the terminal to execute following operation when executing S4:

S41, sequentially acquiring, by the upper-layer application, the buffered data packets by using the read pointer of the busy queue;

S42, sequentially processing, by the upper-layer application, the buffered data packets; and S43, sequentially acquiring and releasing, by the upper-layer application and from the idle queue, the addresses of the processed buffered data packets in the busy queue by using the write pointer of the idle queue.

17. The terminal according to claim 16, wherein the processor is configured to call the computer program from the memory and run the computer program to cause the terminal to execute following operation when executing S5:

S51, acquiring the read pointer and the write pointer of the busy queue and the read pointer and the write pointer of the idle queue in real time;

S52, determining whether the read pointer of the busy queue is equal to the write pointer of the busy queue;

in a case where the read pointer of the busy queue is equal to the write pointer of the busy queue, determining that the busy queue is empty and there is no buffered data packet, and returning to S2; and in a case where the read pointer of the busy queue is not equal to the write pointer of the busy queue, proceeding to S53, or proceeding to S54;

S53, determining whether a next position of the write pointer of the busy queue is the read pointer of the busy queue;

in a case where the next position of the write pointer of the busy queue is the read pointer of the busy queue, determining that the busy queue is full, and proceeding to S55; and in a case where the next position of the write pointer of the busy queue is not the read pointer of the busy queue, returning to S2;

S54, determining whether a next read pointer of the idle queue is greater than the write pointer of the idle queue;

in a case where the next read pointer of the idle queue is greater than the write pointer of the idle queue, determining that idle memory addresses of the idle queue have been completely consumed, and proceeding to S55; and in a case where the next read pointer of the idle queue is not greater than the write pointer of the idle queue, returning to S2; and S55, repeating S1 to set an additional buffer pool.

18. A non-transitory storage medium, wherein the storage medium stores instructions, when running on a computer, executed the instructions by a processor to perform following operations:

S1, setting ring buffer queues, setting a length of each ring buffer queue according to a size of a total buffer space and the number of threads of an upper-layer application, then setting a buffer pool formed by two ring buffer queues, and setting the two ring buffer queues in the buffer pool as a busy queue and an idle queue, respectively;

S2, receiving, by a network card driver, data packets from a data link, classifying the data packets, sequentially buffering the classified data packets into the busy queue by using a write pointer of the busy queue, and then sequentially mapping addresses of the buffered data packets in the busy queue into the idle queue;

S3, acquiring latest addresses of the buffered data packets in the busy queue by using a read pointer of the idle queue;

S4, sequentially acquiring, by the upper-layer application, the buffered data packets by using a read pointer of the busy queue and processing the data packets, and after processing of the data packets is completed, sequentially releasing addresses of the processed buffered data packets in the busy queue by using a write pointer of the idle queue; and S5, acquiring the read pointer and the write pointer of the busy queue and the read pointer and the write pointer of the idle queue in real time, and according to relationships between the read pointer and the write pointer of the busy queue in real time and between the read pointer and the write pointer of the idle queue in real time, determining a state of the buffered data packets in the buffer pool, and whether an additional buffer pool needs to be set.

* * * * *